United States Patent [19]

Jenney et al.

[11] 4,184,367
[45] Jan. 22, 1980

[54] NIPPLE FLOW RATE TESTER

[75] Inventors: Hilas L. Jenney, Shiloh; John Mlay, Jr., Mansfield, both of Ohio

[73] Assignee: Abbott Laboratories, North Chicago, Ill.

[21] Appl. No.: 952,187

[22] Filed: Oct. 16, 1978

[51] Int. Cl.$^2$ ............................................. G01M 3/02
[52] U.S. Cl. ............................................ 73/37; 73/3; 73/198
[58] Field of Search .................. 73/168, 198, 38, 37.5, 73/37, 3, 4 R, 1 R

[56] References Cited

U.S. PATENT DOCUMENTS 1,031,187  7/1912  Larsen .................................. 222/356

OTHER PUBLICATIONS

Benson, J. M., et al., Testing Small Orifices, in Instruments & Control Systems, vol. 33, pp. 996-998, Jun. 1960.

*Primary Examiner*—Gerald Goldberg
*Assistant Examiner*—Joseph W. Roskos
*Attorney, Agent, or Firm*—Robert L. Niblack; Neil E. Hamilton

[57] ABSTRACT

An apparatus which can accurately determine the flow rate through a nipple orifice such as nipples which are used in conjunction with baby bottles. The testing apparatus utilizes a purging nozzle which will expel air into the nipple so as to remove any particulate matter so that a subsequent accurate reading can be obtained. The nipple is then placed on a test nozzle unit which is raised into contact with a nipple receiving head on a rotameter. When the nipple is placed in contact with the nipple receiving head, it will be maintained in contact automatically by means of air pressure in the test nozzle housing which ultimately will flow through the nipple orifice and into the rotameter. A reading on the rotameter will give an indication of the nipple flow rate. By a unique valving arrangement, the test nozzle will hold the nipple against the rotameter nipple receiving head so as to provide a uniform force and an accurate reading.

18 Claims, 8 Drawing Figures

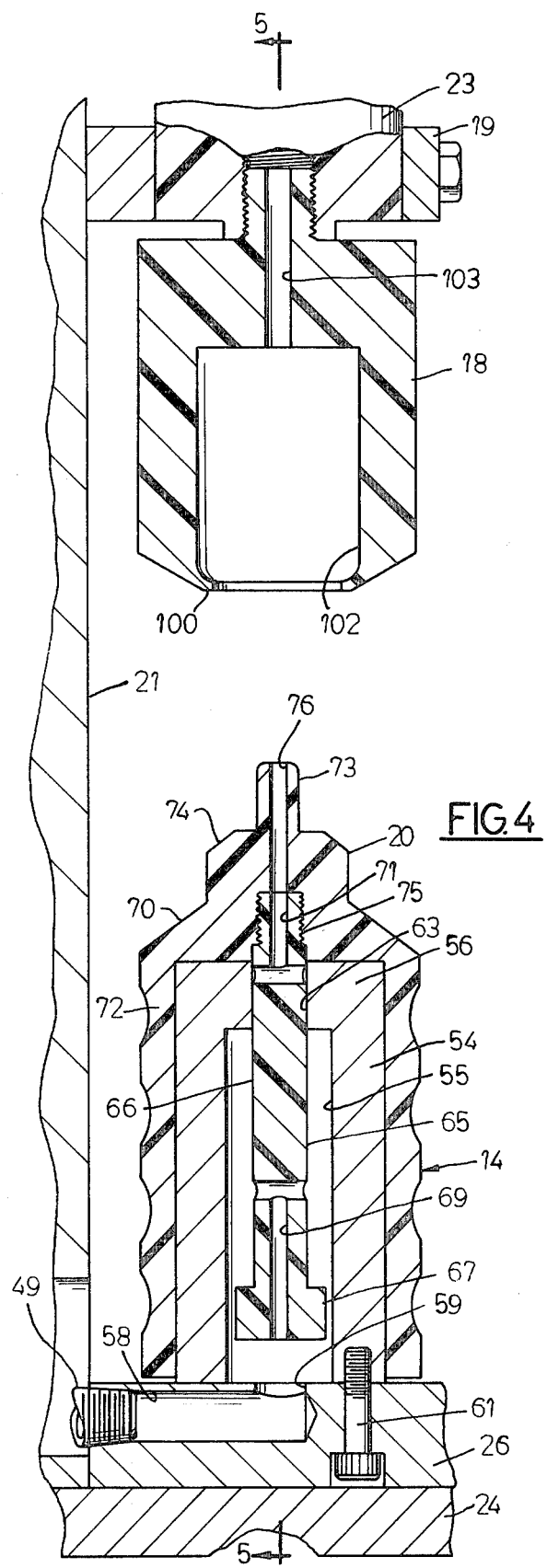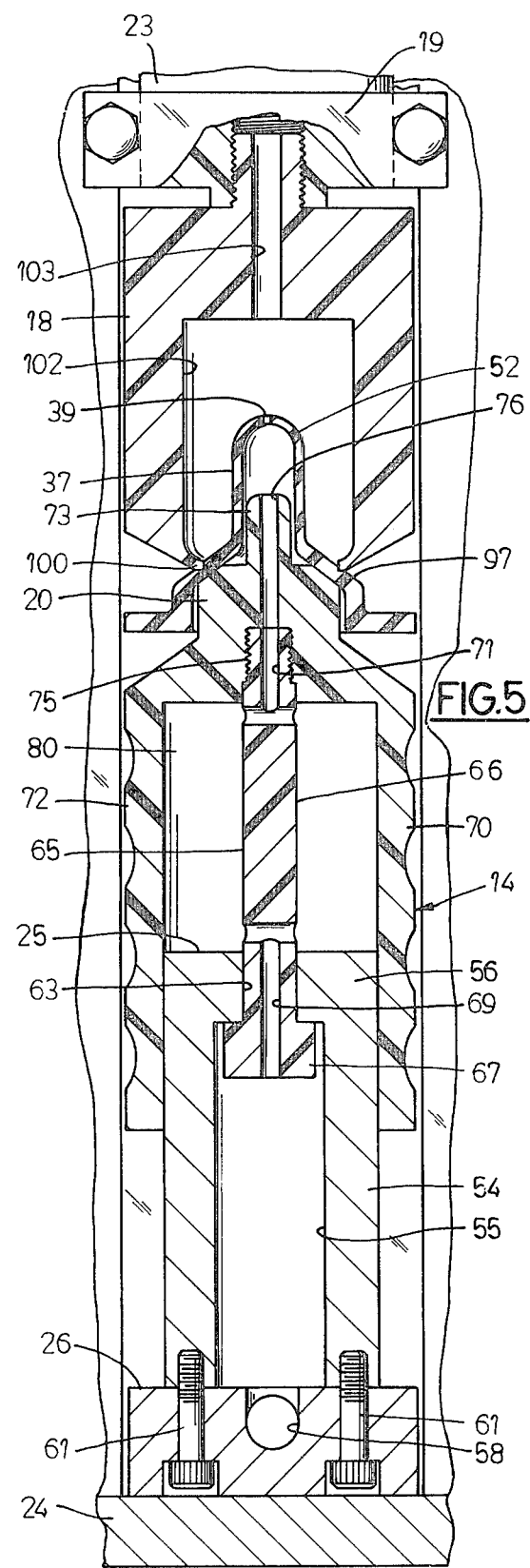

NIPPLE FLOW RATE TESTER

BACKGROUND OF THE INVENTION

This invention relates to an apparatus for testing the flow rate in a baby bottle nipple. More particularly, it relates to a nipple flow rate testing device which can accurately and consistently effect nipple flow rate determinations in conjunction with a unique test nozzle assembly and a rotameter.

There is not currently available on the open market a nipple flow rate testing device which can accurately and consistently indicate nipple flow rates. In the past, attempts to measure flow rates through nurser nipples utilized a measuring of supply pressure or pulling a vacuum on the nipple. Test results were not accurate as in some instances the test pressures were not constant, vacuum forces were too great and nipple apertures were distorted. In testing nipples to determine orifice size and consequently nipple flow rate, it is important that tests be made as simply and accurately as possible. It often happens that nurser nipples have apertures wherein the normal manufacturing particulates and process coatings can partially obstruct the holes. If they are not purged prior to testing, a false reading would be obtained such as low flow rates and contaminates could be transferred from the nipple into the device from which a reading is being made. Another factor affecting proper determination of a nipple flow rate is the technique in obtaining a reading from a measuring device such as a rotameter. If the nipple is not placed against a nipple receiving end of a rotameter with a constant force, a pumping action results between the nipple and the rotameter effecting an inaccurate reading. Inaccurate readings also occur if the nipple is not centrally aligned with the rotameter in a proper manner. In U.S. Pat. No. 1,031,187, a hollow stem valving arrangement is indicated for measuring and bottling liquids. The valving arrangement in this particular prior art unit in no way offers a solution to the present problem of accurate nipple flow rate testing.

It is an advantage of the present invention to provide an apparatus which can accurately indicate the flow rate through a nursing nipple orifice. Other advantages are a nipple flow rate tester which can measure flow rates through nipples having a single orifice or multiple orifices; provides for a purging of the nipple prior to testing; a test nozzle member which provides a constant force on the nipple during the testing procedure; a test nozzle member which automatically maintains the nipple in a sealing relationship with a nipple head receiver of a measuring instrument; a nipple flow rate tester unit which can be utilized with a minimum degree of skill and technical training; a nipple flow measuring device which can accommodate nursing nipples of various configurations, and a nipple flow rate tester which can be fabricated from available components and materials resulting in a testing device which can be fabricated at a minimum cost.

SUMMARY OF THE INVENTION

The foregoing advantages are accomplished and the shortcomings of the prior art are overcome by the present apparatus for accurately testing the flow rate of a nursing nipple. A flowmeter, preferably in the form of a rotameter, has a nipple receiving head positioned in conjunction with a test nozzle member so that the nipple to be tested is self supported in the nipple receiving head. A regulated source of pressurized gas is provided in conjunction with the test nozzle member so that the gas will flow through the orifice or orifices of the nipple and the flow rate indicated by means of the flowmeter. A test pressure guage will indicate if proper sealing of the nipple on the test nozzle member and in the nipple receiving head is accomplished. A purge nozzle assembly is provided by means of a piston block member defining a hollow chamber with a hollow body member slidably positioned over the piston block. A nipple support portion is provided on the hollow body member and a gaseous fluid passage means including a piston member is operatively associated with the piston block and the hollow body member to provide a flow of gas through the hollow body member and the nipple seating portion to thereby expel any particulate matter in the nipple. In preferred manner, the nipple support portion is formed in a conical configuration with ribs radiating from a passage in the nipple support so as to prevent pressure buildup in the nipple. The test nozzle member also has a piston block with a plunger member reciprocating in the piston block and having a first channel extending through the plunger member from a head portion and outwardly from the body portion in a lateral manner. A hollow body member is slidably positioned over the piston block and has a nipple receiving end with a passage extending therethrough as well as a side wall for contacting the piston block. The plunger member further has a second channel spaced from the first channel with the second channel communicating with the passage in the heat portion of the hollow body member and extending outwardly from the plunger in a lateral manner. The first channel of the plunger member is arranged to be completely contained in the hollow chamber of the piston block when the head of the hollow member rests against the end portion of the piston block and to provide communication between the piston block hollow chamber and an extended chamber created by a lifting of the hollow body member outwardly from the piston block. The second channel of the plunger member is arranged with the lateral portion sealed in the end portion of the piston block when the hollow member rests against the end portion and to provide fluid communication between the extended chamber and the passage in the head portion of the hollow body member. The nipple receiving head for positioning an orifice or orifices of a nipple is utilized in conjunction with the nipple support on the hollow body member to maintain the nipple in contact with the receiving head at a predetermined force when supported automatically by the hollow body member and extended from the piston block. In a preferred manner, the nipple support portion of the hollow body member has an angular shoulder which acts in conjunction with an annulus portion of the nipple receiving head of the rotameter so as to effect a precise and predetermined compression on the nipple shoulder.

BRIEF DESCRIPTION OF THE DRAWINGS

A better understanding of the present nipple flow rate testing device will be afforded by reference to the drawings wherein:

FIG. 4 is a view taken along line 4—4 of FIG. 2.

FIG. 5 is a view taken along line 5—5 of FIG. 4 except showing the test nozzle in a raised position with a nippe attached.

DESCRIPTION OF THE PREFERRED EMBODIMENT

Figure 1:
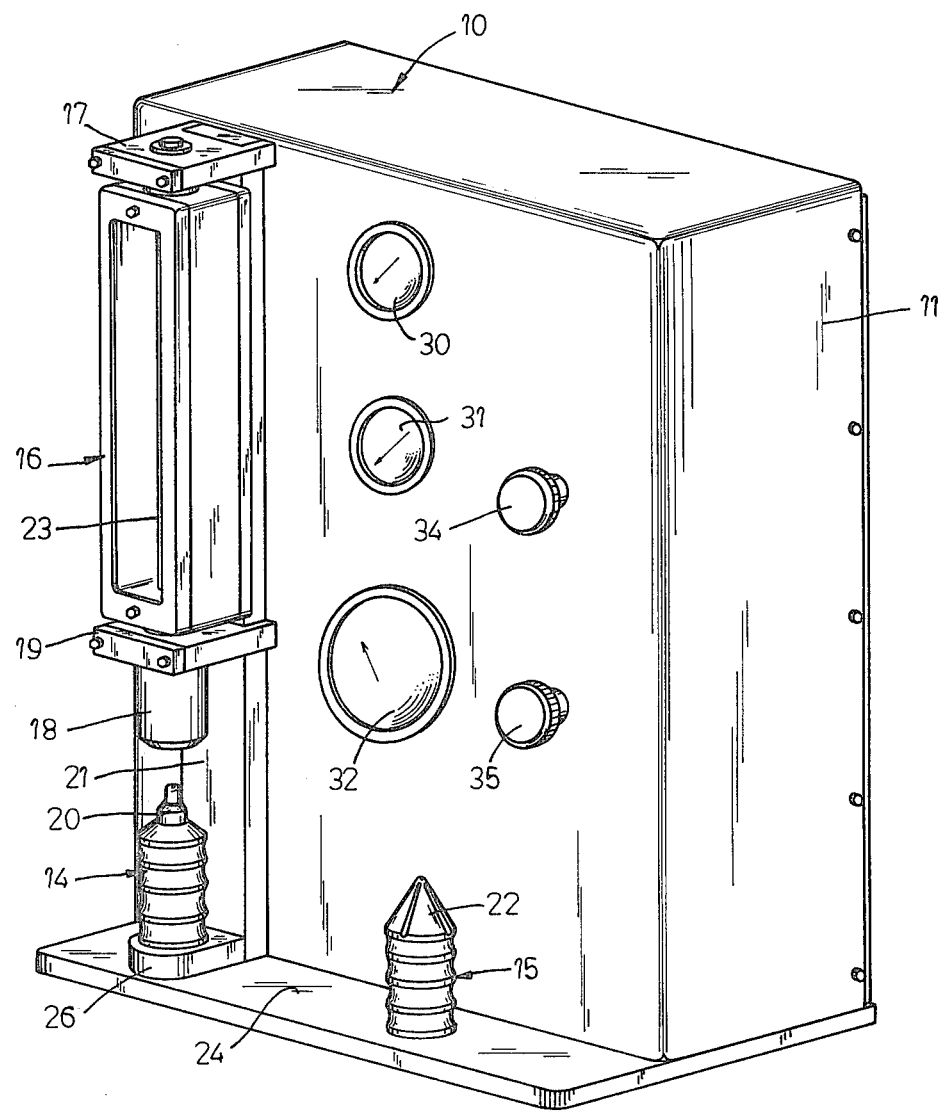
FIG. 1 is a perspective view of the nipple flow rate testing device illustrating both the purge nozzle and the test nozzle with a rotameter positioned above the test nozzle assembly.

Proceeding to a detailed description of the present invention, the nipple flow rate tester 10 includes a housing 11 and a base mounting portion 24 on which are positioned a purge nozzle 15 and a test nozzle 14, the latter being supported by a base support 26. A rotameter 16 is positioned above test nozzle 14 and is supported by means of mounting brackets 17 and 19 extending from housing 11. The rotameter 16 includes a nipple receiving head 18 and test nozzle 14 has a nipple support portion 20 for a nipple, which, as will later be explained, will be lifted into the nipple receiving head 18. A support bar 21 extends from base mounting 24 to support mounting brackets 19, 17 and interconnect with bracket 26 to effect a modular unit.

Suitably mounted in housing 11 is an air supply pressure guage 30, a purge air pressure guage 31 and a test air pressure guage 32. Purge air control knob 34 also extends from housing 11 as does a test air control knob 35.

Figure 2:
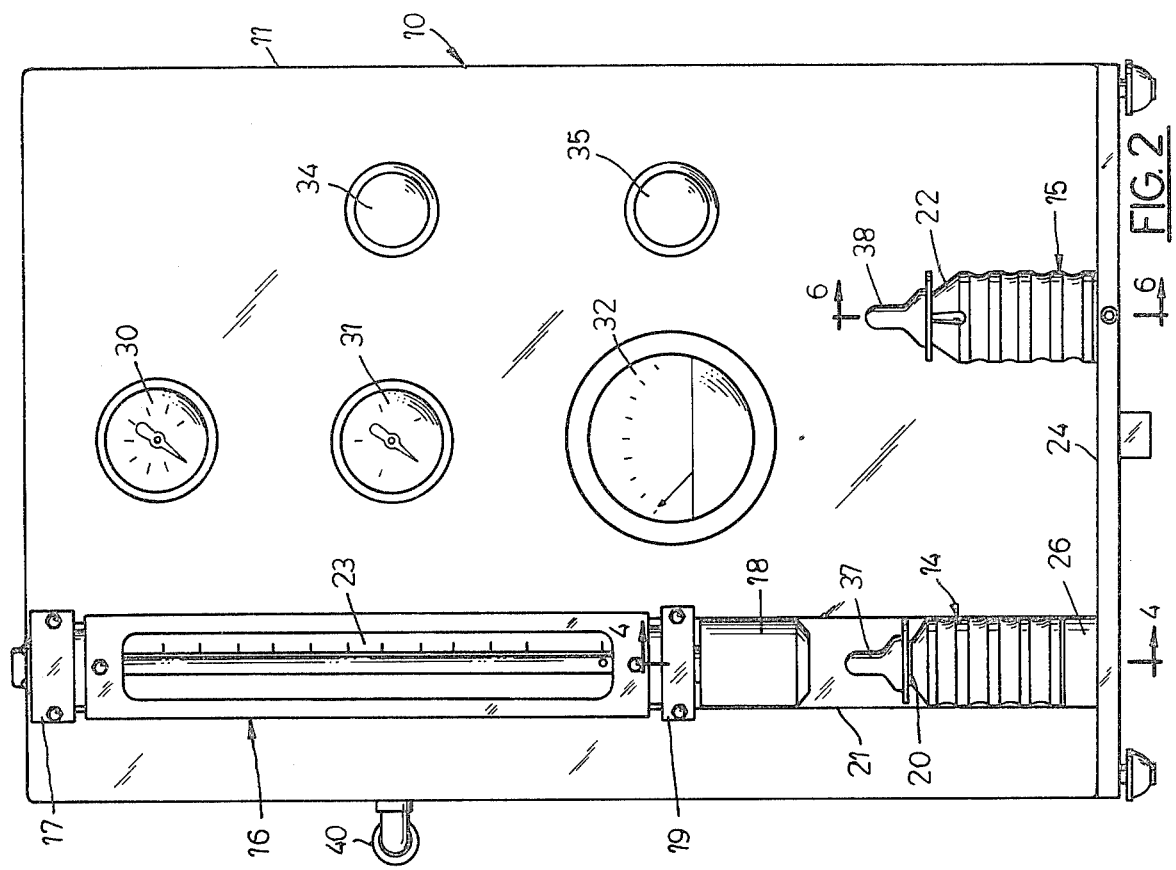
FIG. 2 is a view in side elevation of the test nozzle unit shown in FIG. 1 and with nipples placed on both the purge nozzle and the test nozzle assemblies.

Referring specifically to FIG. 2, it will be noted that purge nozzle 15 has a flexible nipple 38 placed on nipple support portion 22. Similarly, a nipple 37 is disposed on nipple support portion 20 of test nozzle 14. These nipples are of the baby nurser type. The rotameter 16 includes a calibrated guage section 23 and a vent bracket 17. The preferred rotameter utilzied in test unit 10 is a Model 1110 available from the Books Instrument Division of Emerson Electric Company in Hatfield, Pa. 19440. The rotamete fits into the bracket portions 17 and 19 and is vented as disclosed herein.

Figure 3:
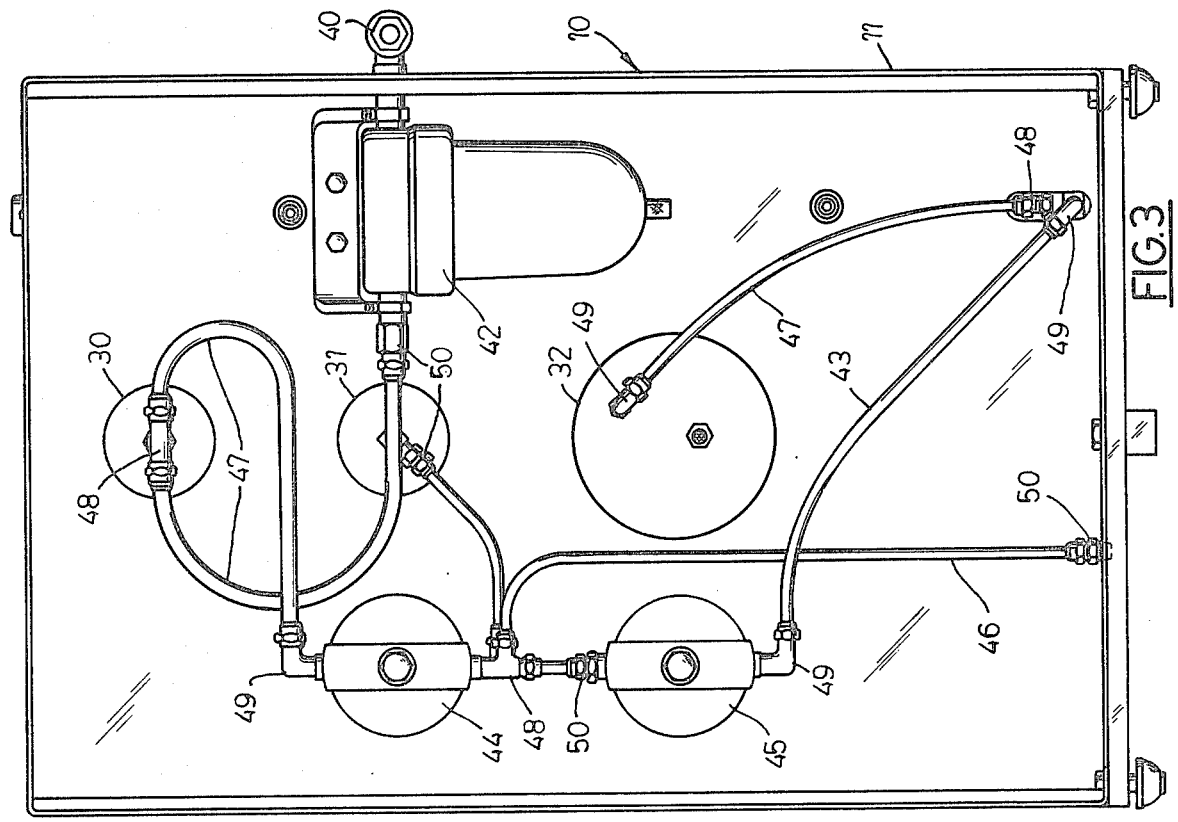
FIG. 3 is a back view of the nipple flow rate tester shown in FIG. 1 with the back panel removed to show the various air regulators and interconnections for the air tubing.

As illustrated in FIG. 3, air is provided in a regulated manner to both the test nozzle 14 and the purge nozzle 15 by means of air inlet connection 40 which is interconnected to air filter 42. A supply pressure guage 30 indicates the incoming pressure of the air. A pressure regulator 44 will regulate the pressure of the purge air by means of knob 34, the pressure being indicated on purge air pressure guage 31. An additional pressure regulator 45 will regulate the pressure to the test nozzle 14 and will be controlled by knob 35 and the pressure indicated on test air pressure guage 32. Suitable tubing 46, 47 and 43 as well as T connectors 48, elbows 49, male and female connectors 50 will make the necessary interconnections between the regulators and the guages, in the manner illustrated. For sake of clarity, it should be pointed out that length of tubing 46 extending from T connector 48 below pressure regulator 44 will supply air to the purge nozzle whereas tubing 43 extending from elbow 49 below regulator 45 will supply the test nozzle 14.

Turning to FIG. 4, it will be noted that test nozzle 14 includes a piston block 54 having a hollow chamber 55 and an end portion 56. An air intake tube 58 is interconnected to tubing 43 leading from regulator 45 by means of connector 49 and will supply air through orifice 59 into hollow chamber 55. Cap screws 61 will provide the necessary attachment of piston block 54 to base support 26 and to seal chamber from outside atmosphere. A passage 63 extends through end portion 56 so as to slidably accommodate a portion of a plunger member 65 which has an elongated body 66 and a head portion 67 of greater diameter of width than the body or passage 63 with plunger 65 being received in a reciprocal manner in chamber 55 and passage 63. A first channel 69 of a generally T-shaped configuration extends from head 67 and laterally outwardly through the elongated body 66. A second T-shaped channel 71 is of a similar configuration as channel 69 but positioned oppositely therefrom and extends outwardly from the lateral sides of the elongated body 66 terminating in an end threaded section 75 which serves as a connection means with hollow body member 70. A passage 76 is provided in nipple support portion 20 and is coextensive with channel 71. Nipple support or head portion 20 is formed from an extending nozzle section 73 and has an angular shoulder section 74 spaced therefrom. Hollow body 70 includes a side wall 72 for slidable engagement over piston block 54. Nipple receiving head 18 of rotameter 16 includes a hollow chamber 102 with a passage 103 interconnecting with rotameter guage 23. The entrance to chamber 102 is defined by a downwardly sloping annulus portion 100.

FIG. 5 illustrates the test nozzle 14 in the raised position and with the head 52 of a flexible nipple 37 controllably positioned in chamber 102. It will be seen that hollow body 70 will have been slidably raised over piston block 54 to create a second chamber 80 extending from the end wall 25 of piston block 54.

Figure 6:
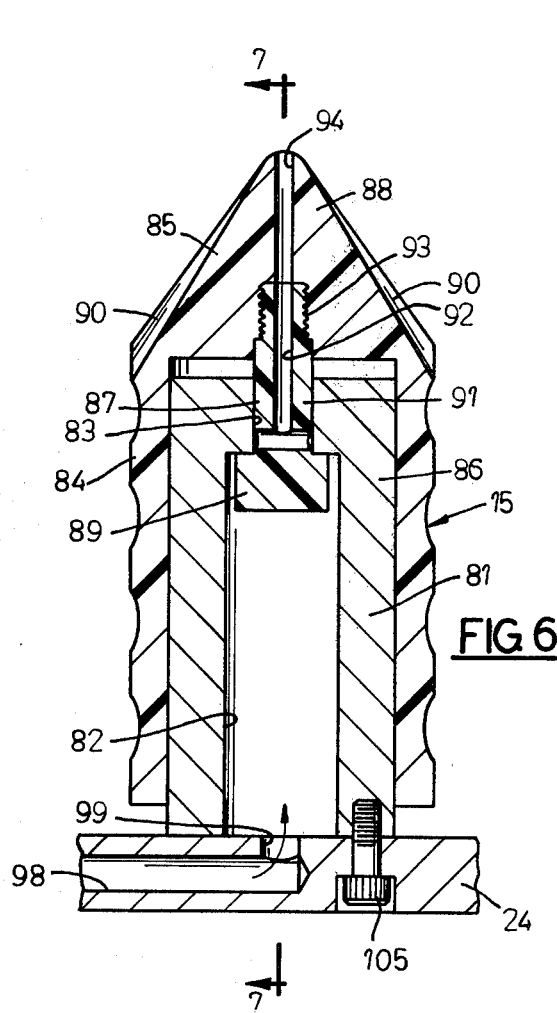
FIG. 6 is a view taken along line 6—6 of FIG. 2.
Figure 7:
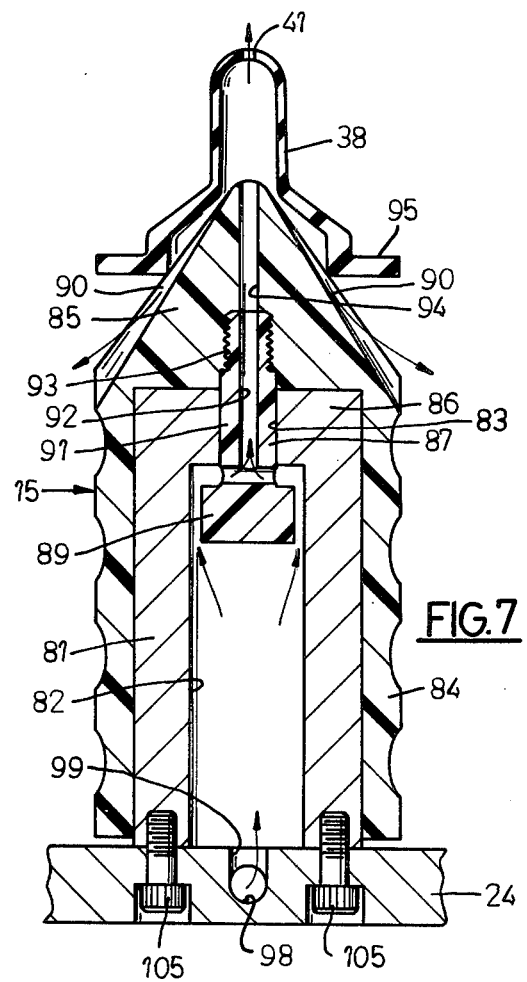
FIG. 7 is a view taken along line 7—7 of FIG. 6 except showing the purge nozzle in a lowered position with a nipple attached.

The purge nozzle is specifically referred to in FIGS. 6 and 7. It, like the test nozzle 14, includes a piston block 81 with a hollow chamber 82. A piston member 87 is slidably and reciprocally received in passage 83 of end portion 86. The piston member 87 has a piston head 89 and an elongated body 91 for sliding in passage 83. Air is supplied to hollow chamber 82 by means of channel 98 and orifice 99. Air intake passage 98 will be interconnected with tubing 46 which interconnects with pressure regulator 44. A T-shaped channel 92 extends longitudinally through the elongated body 91 of piston member 87 as well as opening laterally thereof. Passage 92 is interconnected with passage 94 in conical nose 88 of nipple support 85 by means of threaded connection 93 between hollow body member 84 and piston member 87. Extending radially from the end of conical nose 88 are spaced ribs 90 which will provide a spacing between the nipple 38 and the nipple support 85. A cap screw 105 provides the attachment of piston block 81 to base mounting 24. It will be seen in FIGS. 6 and 7 that hollow body member 84 is slidably positioned over piston block 82 in a fluid tight manner so that it can be raised therefrom as indicated in FIG. 6 or allowed to contact the end portion 86 as shown in FIG. 7. The placement of the piston member 87 in.the hollow chamber 82 and in conjunction with hollow body member 84 is designed so that when air is introduced into chamber 82 the piston head 89 will contact end portion 86 and thereby close off channel 92. If a force is exerted on the hollow body member 84 in a direction of base mounting 24, this will move piston head 89 away from end portion 86 and thereby allow air to travel around the sides of the piston head 89 and into channel 92 and ultimately into passage 94.

Figure 8:
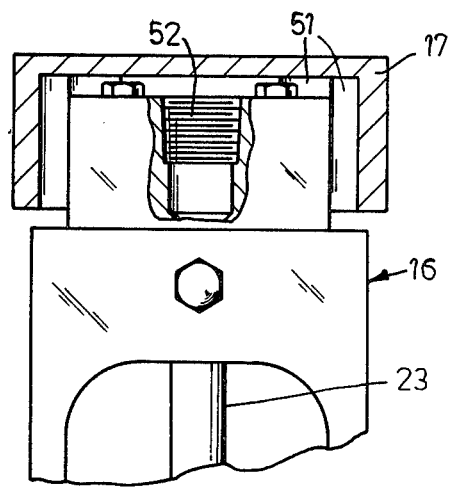
FIG. 8 is a partial detailed view of the venting structure of the rotameter shown in FIG. 1 and 2.

Referring to FIG. 8, it can be seen that mounting bracket 17 includes vent passageways such as 51 which are defined in the underside and inside walls of bracket 17. The passageways interconnect with a central channel 52 which is in fluid communication with gauge tube 23. Preferably four vent passageways 51 will be equidistantly spaced inside bracket 17 at the side and front walls.

Operation

A better understanding of the advantages of the nipple testing device 10 will be had by a description of its operation. Air will be supplied to the air inlet connection 40 preferably in the range of 30-120 psi. The pressure to the purge nozzle will be regulated through knob 34 and regulator 44 and the pressure of the air to the test nozzle 14 will be regulated by means of knob 35 and regulator 45. With the various air pressures set at the desired pressure, it will be noted in conjunction with purge nozzle 15, air will enter through passage 98 and orifice 99 and into chamber 82 to maintain the piston head 89 against end portion 86 to seal channel 92 from the chamber 82 and position hollow body 84 away from piston block 81 as shown in FIG. 6. The nipple testing device is now ready for purging. A nipple 38 will be placed on nipple support 85 of purge nozzle 15, as indicated in FIG. 7. The nipple and the nipple support will be moved downwardly and in the direction of base 24 until channel 92 is in communication with chamber 82. Air will then flow around piston head 89 into channel 92 through passage 94 and out through nipple 38 and orifice 41. This procedure assures that any particulate matter or coating which may be inside the nipple or obstructing the nipple aperture 41 is removed. In order to prevent any rupture or blowout of the nipple, spaced ribs 90 will permit air to also flow outwardly from the base portion 95 to the atmosphere. The nipple is now ready to be tested concerning its flow rate. A cleaned or purged nipple such as 37 will be placed on nipple support portion 20 of the test nozzle 14. With the nipple so seated, hollow body 70 will be raised with the nipple thereon from a position shown in FIG. 4 wherein channel 69 is completely housed in chamber 55 and channel 71 sealed in end portion 56 to a position shown in FIG. 5. The travel of hollow body 70 and plunger member 65, as limited by head 67 contacting end portion 56, is such that when head 67 contacts the end portion 56, the annulus 100 of chamber 102 will slightly but sealably contact the shoulder 97 of nipple 37. With the hollow body member 70 in the position shown in FIG. 5, air will travel from hollow chamber 55 through first channel 69 into the second chamber 80, created by the extension of the hollow body member from piston block 54 and end wall 25, into the second channel 71 and passage 76 whereupon it will travel out through aperture 39 of nipple 37. Air will subsequently enter chamber 102 of nipple receiving head 18 and flow into passage 103. The rate of flow will be read on the rotameter gauge 23. The nipple aperture flow rate can be calculated by means of a formula described in the "New Compressed Air and Gas Data Manual", pages 5-14; C. W. Gibbs, Editor; Ingersoll-Rand, Publisher; (1971). Conversion scales (not shown) are placed adjacent gauge section 23 for ease of calculations. Different scales can be used depending on the number of apertures in the nipple. Conversely, the hole size can be calculated by using the measured flow rate. Air will ultimately be vented from rotameter 16 by means of vent passageways 51.

In the previously described procedure, it will be noted that when nipple 38 was placed on purge nozzle 15, that air is allowed to escape from the nipple base portion 95. This in an important feature in that the nurser feed holes are quite small, i.e., typically 0.006-0.015 inches in diameter and normal manufacturing particulates and process coatings can partially obstruct the holes. If they are not purged prior to testing, this would result in false, low flow rates and "contaminants" being blown into the rotameter. Also, by allowing the air to escape by means of the spaced ribs 90 which in effect form flutes on nipple support 85, the nipple cannot be sealed so as to allow undesired pressure buildup which could cause a ballooning action and a subsequent bursting of the nipple. This aspect and a 30 psi maximum air pressure are safety features that should meet or exceed OSHA requirements.

Another important feature resides in the selfsustaining plunger member 65 in test nozzle 14. Once the piston member 65 is raised to the position shown in FIG. 5, the air pressure will act on the piston head 67 to support the nipple agaist the annulus 100. The force at which the nipple will be compressed against annulus 100 is regulated by the test air pressure. Consequently, a constant force is effected, eliminating the problems of manual forcing of the nipple against the annulus which can vary from individual to individual. Irregular force can cause a pumping action by the nipple and the annulus 100 resulting in false readings. In a like manner insufficient foce would not seal off the annulus 100 with the nipple shoulder 97 also resulting in air escaping from chamber 102 and resulting in an erroneous flow rate reading, as indicated by the test pressure gauge 32 dropping below its set point. Positive engagement of the annulus 100 with the nipple shoulder 97 is also assured by means of annular shoulder 74 on hollow body 70.

The piston blocks 54 and 81 are preferably fabricated from stainless steel. However, other materials such as brass could be used. Plunger members 65 and 87 are fabricated from nylon but could be manufactured from polyethylene. The hollow body members 70 and 84 are preferably formed of a nylon material. Other materials such as polyethylene could be utilized. The nipple receiving head 18 is fabricated from nylon material but could be formed from polyethylene.

It will be appreciated that various pressures will be utilized for certain nipples having one or more orifices and different hole sizes. The present unit permits pressures to be varied from 2 to 30 psi for the purge nozzle to 0 to 80 cm of water column for the test nozzle for this purpose.

It will thus be seen that through the present invention there is now provided an accurate and positive testing device which can indicate flow rate through a baby nurser nipple having one or more orifices. The testing device can be fabricated from readily available components and accordingly is economical to manufacture. The testing device affords a semiautomatic manner of positioning the nipple in a rotameter in a manner that a constant and known force is exerted on the nipple thus resulting in accurate readings. The test nozzle member can accommodate nipples of various configurations and the testing device is modular in construction so that maintenance and repair is facilitated.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A test nozzle assembly for indicating gaseous flow through a flexible nipple having at least one orifice comprising:
   a piston block defining a hollow chamber and an end portion at one end thereof;
   means to seal said hollow chamber from outside atmosphere at another end opposite said one end;
   means to introduce a gaseous fluid into said chamber;
   a passage defined by said end portion of said piston block;
   a plunger member having a body and a head portion constructed and arranged for reciprocal movement in said chamber;
   said plunger member defining a first channel extending through said plunger member from said head portion and outwardly from said body portion in a lateral manner;
   a hollow body member slidably positioned over said piston block; said hollow body defining a head portion having a nipple receiving end with a passage extending therethrough and a side wall for contacting said piston block;
   said plunger member further defining a second channel spaced from said first channel, said second channel communicating with said passage in said head portion of said hollow body member and extending outwardly from said plunger member in a lateral manner;
   said first channel of said plunger member constructed and arranged to be completely contained in said hollow chamber of said piston block when said head portion of said hollow body member rests against said end portion of said piston block and to provide communication between said piston block hollow chamber and a chamber created by a lifting of said hollow body member outwardly from said piston block;
   so that fluid will flow into said piston block chamber, through said first channel of said plunger, into said chamber created by the lifting of said hollow body member, into said second channel of said plunger member and outwardly through said nipple receiving end of said hollow body member.

2. The test nozzle as defined in claim 1 wherein said nipple receiving end of said hollow body member includes an extending nozzle section.

3. The test nozzle as defined in claim 2 wherein said nipple receiving end of said hollow body member further includes an angular shoulder portion spaced from said nozzle section.

4. The test nozzle as defined in claim 1 wherein said head portion of said hollow body member and said plunger member define a connection means for said second channel of said plunger and said passage in said head portion of said hollow body member.

5. The test nozzle as defined in claim 1 wherein said first and second channels of said plunger member are of a generally T-shaped configuration.

6. The test nozzle as defined in claim 5 wherein said plunger member defines an elongated body portion in addition to said head portion with said head portion having a greater width than said body portion.

7. The test nozzle as defined in claim 6 wherein said head portion of said plunger is of a greater width than the passage defined by the end portion of said piston block.

8. A nipple flow rate testing device for indicating gaseous flow through a flexible nipple having at least one orifice comprising:
   a test nozzle member defined by a piston block including a sealed hollow chamber and a passage extending from outside said piston block to said hollow chamber;
   means to introduce a gaseous fluid into said chamber;
   a plunger member defined by a head portion and an elongated body portion constructed and arranged for reciprocal movement of said head portion in said chamber of said piston block and said elongated body portion through said passage;
   a hollow body member slidably positioned over said piston block and defining a nipple receiving head portion with a fluid passage, said plunger member operatively connected with said body member, said hollow body member and said piston block effecting a second chamber when said hollow body member is extended thereover;
   first and second fluid passage means operatively associated with said plunger member, said piston block and said hollow body member to permit fluid flow from said hollow chamber through said nipple support portion when said hollow body member is extended from said piston block and to prevent flow when said hollow body member is seated on said piston block;
   a flowmeter including a nipple receiving head for positioning the head and an orifice of a nipple therein when supported by said hollow body member and extended from said piston block;
   whereby fluid flow through the nipple orifice and indicated by said flowmeter is an indication of nipple flow rate.

9. The nipple flow rate testing device as defined in claim 8 wherein said means to introduce a fluid into said chamber includes a regulated air supply means.

10. The nipple flow rate testing device as defined in claim 8 further including a purge nozzle assembly defined by:
    a piston block member defining a hollow chamber;
    means to introduce a gaseous fluid into said chamber;
    a hollow body member slidably positioned over said piston block;
    a nipple support portion provided on said hollow body member;
    gaseous fluid passage means operatively associated with said piston block and said hollow body member to provide a flow of gas through said hollow body member and said nipple support portion when said hollow body member is seated on said piston block member and to stop the flow of gas when said hollow body member is positioned away from said piston block.

11. The nipple flow rate testing device as defined in claim 10 wherein said gaseous fluid passage means of said purge nozzle assembly includes a piston member reciprocally received in said piston block.

12. The nipple flow rate testing device as defined in claim 11 wherein said nipple support portion is defined by a conical nose portion.

13. The nipple flow rate testing device as defined in claim 12 wherein said conical nose portion further includes spaced rib members radiating from the end of the cone.

14. The nipple flow rate testing device as defined in claim 10 wherein said means to introduce said gaseous fluid into said chambers of said test nozzle and said purge nozzle includes a base mounting portion with a fluid passage defined in said base mounting portion.

15. The test nozzle as defined in claim 8 wherein said nipple receiving head portion of said hollow body member of said test nozzle member further includes an angular shoulder portion spaced from said fluid passage in said hollow body member and said nipple receiving head of said rotameter includes an annulus portion for compressing a section of said nipple between said angular shoulder and said annulus.

16. A nipple flow rate tester for indicating a flow rate through one or more apertures for a flexible nipple comprising:
  a flowmeter including a nipple receiving head;
  a test nozzle member defining a nipple support portion and a gaseous passage means in the nipple support portion;
  means to supply pressurized gas to said gaseous passage means; and
  pressure indicating means in communication with said pressurized gas supply;
  so that said gas will flow through said gaseous passage means, said aperture of said nipple and into said nipple receiving head of said flowmeter and a reading on said flowmeter wll be an indication of the flow rate of said aperture or apertures.

17. The nipple flow rate tester as defined in claim 16 wherein said test nozzle member includes means operatively associated with said gaseous passage means to maintain said nipple against the nipple receiving head.

18. The nipple flow rate tester as defined in claim 16 wherein said flowmeter is a rotameter.

* * * * *